United States Patent [19]

Denison

[11] 4,140,213
[45] Feb. 20, 1979

[54] INDUCTION SYSTEM FOR A SORTATION CONVEYOR

[75] Inventor: Reiner K. Denison, Louisville, Ky.

[73] Assignee: A-T-O Inc., Willoughby, Ohio

[21] Appl. No.: 790,438

[22] Filed: Apr. 25, 1977

[51] Int. Cl.² .............................................. B65G 47/51
[52] U.S. Cl. ...................... 198/358; 198/437;
 198/572; 198/575; 198/576; 198/577; 198/579;
 198/601; 198/857; 214/11 R
[58] Field of Search ............... 198/356, 358, 362, 366,
 198/370, 371, 436, 437, 445, 464, 465, 467, 469,
 471, 571, 572, 575, 576, 577, 601, 855, 857, 858,
 859, 579; 214/11 R

[56] References Cited

U.S. PATENT DOCUMENTS

| | | | |
|---|---|---|---|
| 2,877,883 | 3/1959 | Lanham | 198/445 |
| 2,886,164 | 5/1959 | Solecki | 198/358 |
| 2,909,267 | 10/1959 | Ferguson | 198/436 |
| 2,959,269 | 11/1960 | Kammerer | 198/437 X |
| 3,034,665 | 5/1962 | Speaker | 214/11 R |
| 3,044,603 | 7/1962 | Fry | 198/831 |
| 3,056,482 | 10/1962 | Lanham et al. | 198/437 X |
| 3,100,565 | 8/1963 | Fry | 198/831 X |
| 3,491,903 | 1/1970 | Hedrick et al. | 214/11 R |
| 3,613,863 | 10/1971 | Hedrick et al. | 198/415 |
| 3,799,319 | 3/1974 | Cutler et al. | 198/416 |
| 3,880,298 | 4/1975 | Habegger et al. | 214/11 R |
| 3,913,725 | 10/1975 | Harrison | 198/356 |
| 3,982,625 | 9/1976 | Wentz et al. | 198/572 |

Primary Examiner—Robert W. Saifer
Assistant Examiner—James L. Rowland
Attorney, Agent, or Firm—Wood, Herron & Evans

[57] ABSTRACT

An induction system for a sortation conveyor includes a single infeed conveyor adapted to supply two separate loading stations. In a preferred embodiment, the infeed conveyor is operatively connected with a reversible turn conveyor interposed between the infeed conveyor and the two separate loading stations, one loading station receiving articles from one end of the reversible turn conveyor and the other loading station receiving articles from the other end of the reversible turn conveyor. The reversible turn conveyor may be automatically or manually controlled to operate in either a clockwise or a counterclockwise direction as required to supply articles from the infeed conveyor to both loading stations.

23 Claims, 6 Drawing Figures

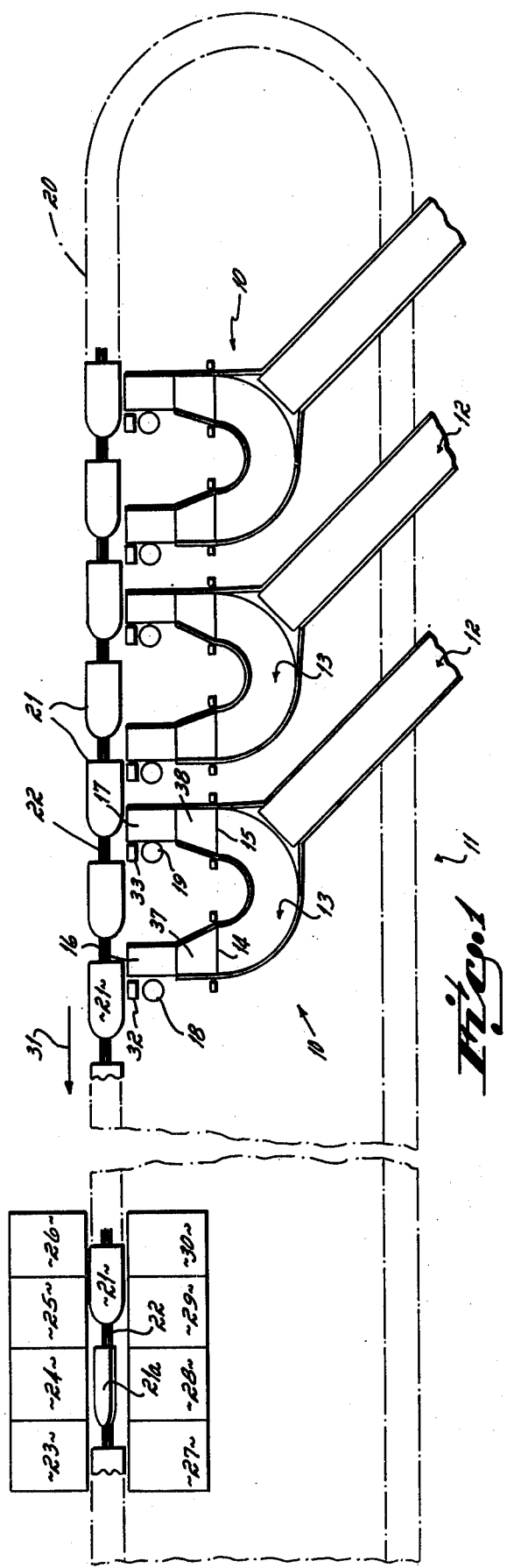

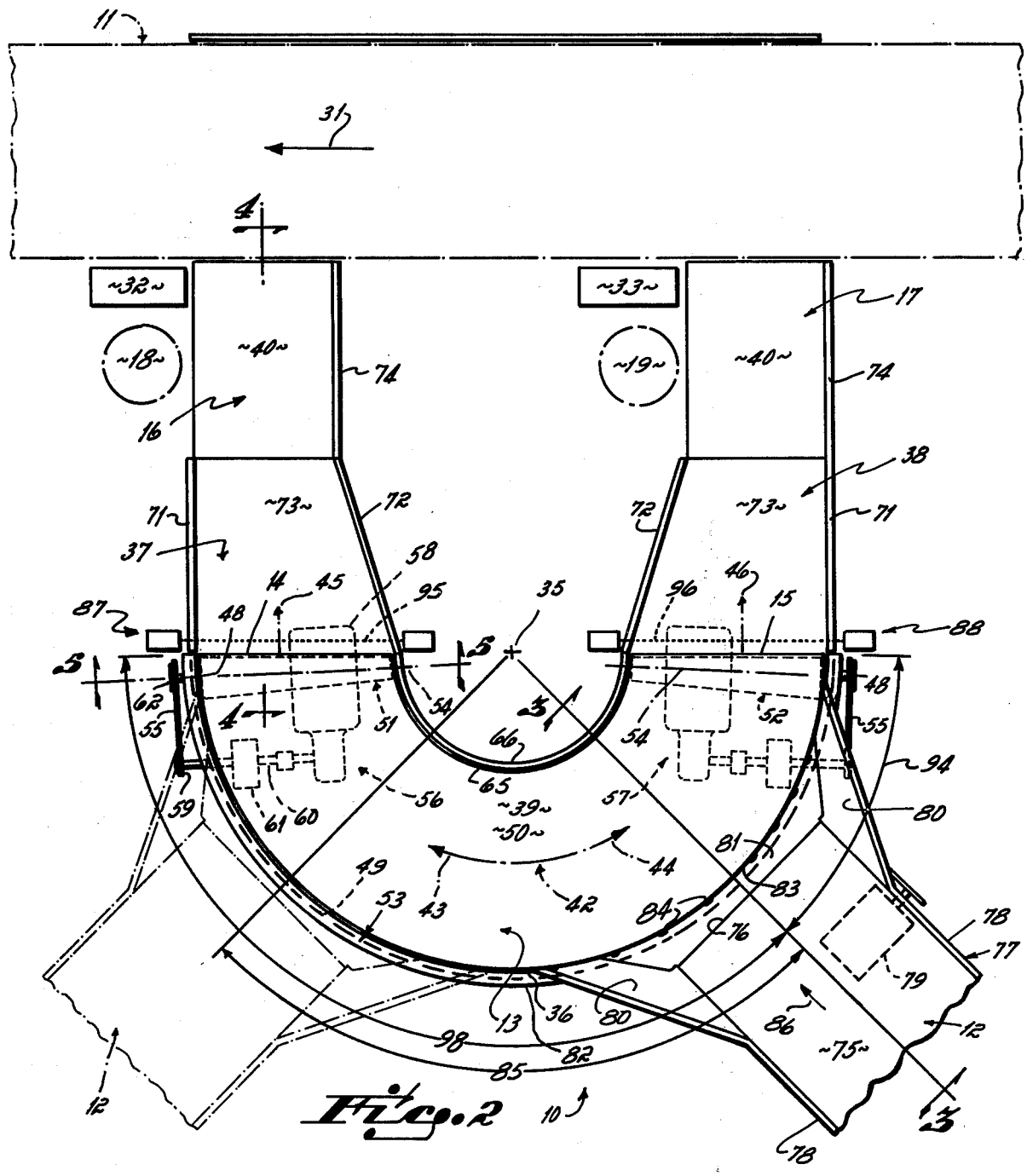
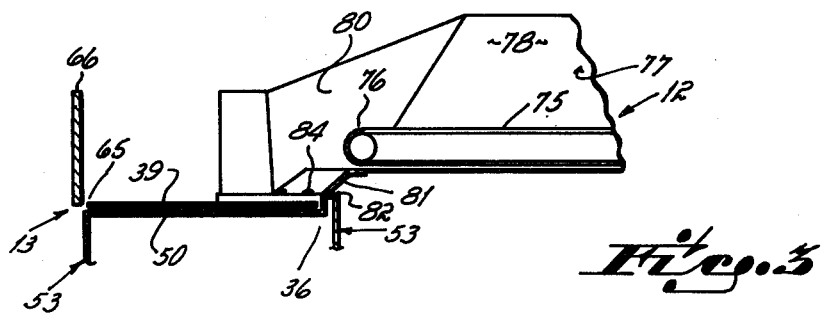

INDUCTION SYSTEM FOR A SORTATION CONVEYOR

This invention relates to article handling apparatus. More particularly, this invention relates to an induction system for a sortation conveyor.

In recent years, article sortation equipment has become increasingly used, and indeed necessary under certain operation circumstances, in order to effectively and economically sort articles originally presented to the equipment in random mix fashion. Such article sortation systems find use in those situations involving a high number of articles that must be processed from a totally random input mix into a predetermined order or output mix, the output mix sortation being required for subsequent processing of those articles. Typical end use situations of such article sortation equipment is found in warehousing operations where packaged articles are presented to the equipment in a random input mix in which the articles are not categorized by geographic destination or by type of goods, the article sortation system thereafter being employed to categorize the packaged articles by geographic destination or by type of goods. The article sortation equipment, in effect, sorts the packaged articles from the initial random geographic destination or type mix into a predetermined geographic area destination or type mix, the packaged articles being subsequently delivered to appropriate receiving stations and stored or shipped from the warehouse to the desired destinations.

There has been developed, as now known to the prior art, a conveyor system which incorporates a mechanical sorting and distribution mechanism that is relatively rapid and reliable. This conveyor system is capable of handling a throughput of large quantities of packaged articles which must be sorted in large merchandising houses. The basic structure and method of this conveyor system is disclosed in Speaker U.S. Pat. No. 3,034,665, assigned to the assignee of this application. The Speaker conveyor system utilizes a sortation conveyor which includes a plurality of individual carriages connected in a closed-loop conveyor fashion, each carriage including a truck and a tiltable tray mounted thereon. Each individual carriage is conveyed past an article loading station where an article is manually or otherwise placed on the tray of the carriage. Thereafter, the carriage is conveyed to a downstream discharge area having a plurality of article receiving stations. When the carriage is adjacent the appropriate receiving station in the discharge area, as determined by electronic or electromechanical control means inherent in the conveyor system, and as programmed by an operator at the loading station, the tray is tilted to discharge the article onto the receiving station. In other words, each tray is tiltable so that when an article placed on a carriage passes a predetermined receiving station adjacent the conveyor's route, the carriage's tray can be mechanically tilted for dumping the article onto the receiving station.

In an article sorting system as disclosed in the Speaker '665 patent, it is necessary to introduce the articles onto the sortation conveyor's trays, a single article being placed on each tray, and to code the conveyor system so that each tray will discharge or dump its article at the desired and predetermined receiving station. Typically, the article sortation conveyor illustrated in the Speaker '665 patent depends on the use of a human operator to transfer articles from the random mix article supply onto respective sortation conveyor trays, at the loading station, and to program the control means so that the articles are discharged from the appropriate trays in the coded and predetermined receiving stations downstream. While the article sortation conveyor can be made to travel quite fast from an article throughput standpoint, it is quite apparent that the human operator is a limiting factor in the overall article sortation system in that the human operator typically must manually position and code the articles on the sortation conveyor's trays.

Induction device for transferring articles from an infeed conveyor onto the article sortation conveyor are known in the prior art. Heretofore, however, a single separate infeed conveyor has been required at each loading station for transporting the random mix article supply from the supply source to the loading station. In other words, heretofore a single infeed conveyor has been required to supply each induction point.

One specific induction device known to the prior art is disclosed in U.S. Pat. No. 3,613,863. In that device, two separate conveyors are fed from a single supply source via a swinging belt conveyor. Even in this device, however, it is necessary to have two separate conveyors, one feeding each of the actual tray loaders.

In induction devices fed by an infeed conveyor, the equipment is usually capable of delivering articles faster than an operator can code the control and in some instances manually introduce the articles onto the sortation conveyor. As an example, it is believed that a well-trained operator can handle coding and loading at the maximum rate of 60 per minute for a very short time. On the other hand, a rate of 25 articles per minute is a more comfortable rate which can be handled for significant operating periods without incurring an unacceptable rejection or coding error rate. This, of course, varies from operator to operator and from system to system. Also, it should be noted that the actual working rate in any system may be something less or more.

When the articles are of such a size as can be manually handled, the infeed conveyor may be capable of supplying articles at a much faster rate such as 90 articles per minute or even faster. Yet this speed is too fast for the operator to handle and the whole system must be slowed to the capabilities of the operator.

Accordingly, it has been a primary objective of this invention to provide an improved induction system capable of providing increased article induction rates onto a sortation conveyor from a single random mix article supply infeed conveyor.

A further objective of the invention has been to provide an improved article induction system whereby articles in random mix can be inducted onto a sortation conveyor from a random mix article supply infeed conveyor operating at an article supply speed in excess of a single human operator's capability to code the sortation conveyor control and manually introduce the articles onto the sortation conveyor.

A further objective of the invention has been to provide an improved induction system as stated in the aove objectives and having a plurality of manual and automatic operating modes, thereby increasing the operational versatility thereof.

A yet further objective of the invention has been to provide improved means for supplying random mix articles from one infeed conveyor to two sortation conveyor loading stations in an induction system.

A still further objective of the invention has been to provide improved article handling apparatus for dividing and conveying in two paths articles discharged from a single conveyor.

A preferred embodiment of an induction system for a sortation conveyor in accord with the objectives of this invention comprises a single infeed conveyor operatively connected with a single conveyor adapted to supply two separate spaced loading stations from the single infeed conveyor. More particularly, the single conveyor to which the infeed conveyor is attached comprises, in a preferred embodiment, a reversible turn conveyor interposed between the infeed conveyor and the two separate loading stations. One loading station receives articles from one end of the reversible turn conveyor, and the other loading station receives articles from the other end of the reversible turn conveyor. The reversible turn conveyor may be automatically or manually controlled to operate in either a clockwise or a counterclockwise direction as desired by the operators at the two loading stations. In preferred form, each discharge end of the reversible turn conveyor discharges articles onto a respective induction slide that directs the articles onto a distribution table at a loading station adjacent the sortation conveyor.

In use, and when the reversible turn conveyor runs clockwise, it discharges articles onto a first induction slide which supplies a first distribution table. When the reversible turn conveyor runs counterclockwise it discharges articles onto a second induction slide which supplies a second distribution table. The conveyor path direction of the reversible turn conveyor is controlled to optimize distribution of articles to both loading stations. The control may be manual, as controlled by an operator activated switch at each distribution table, or may be automatic, as controlled by a sensor which reverses direction of the reversible turn conveyor upon activation of the sensor due to backed up articles, or may be automatic as controlled by a timer in which case the reversible turn conveyor runs in each of the clockwise and counterclockwise directions for a preselected period of time.

The induction system of this invention permits substantial feeding versatility to both loading stations, the system accommodating many variables such as article quantity, article infeed rate, and human operator capabilities. Accordingly, the speed by which random mix articles may be manually supplied to the article sortation conveyor from a single infeed conveyor is substantially increased over the slower method of indexing each article serially as it comes off an infeed conveyor. Also, the induction system of this invention helps to avoid buildups or backlogs of random mix articles at both loading stations as both those stations are supplied by the same infeed conveyor.

Still further, the invention as embodied in the preferred embodiment offers substantial layout benefits not obtainable by other induction devices. For example, the angle at which the infeed conveyor is connected to the reversible turn conveyor is variable at least through 90°, offering installation adaptability in many warehousing or sorting systems regardless of the angle between the existing infeed units and the sortation conveyor. Moreover, the vertical clearance required for installation can be relatively small, being dependent basically on the height of the infeed conveyor above the reversible turn and of the induction slide.

These and other objectives and advantages of this invention will become even more apparent when taken in conjunction with the following detailed description of a preferred embodiment and with the drawings in which:

FIG. 1 is a top diagrammatic view illustrating three induction systems for a sortation conveyor, each in accord with the principles of this invention;

FIG. 2 is an enlarged top view of a single induction system in accord with the principles of this invention;

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2; and

FIG. 6 is a diagrammatic view illustrating a control diagram for the novel induction system.

An induction system 10 in accord with the principles of this invention is illustrated in combination with a sortation conveyor 11 in FIG. 1. For purposes of illustration, FIG. 1 illustrates the combination of three induction systems 10, each in accord with the principles of this invention, all three in combination with the same sortation conveyor 11, although it will be understood to those skilled in the art that more or less novel induction systems 10 may be used in combination with that sortation conveyor depending on the operational speed of that conveyor. Note particularly that each induction system 10 includes an infeed conveyor 12 connected radially with a reversible turn conveyor 13. The discharge ends 14, 15 of the reversible turn conveyor 13 feeds first 16 and second 17 distribution tables, each distribution table being serviced by a human operator, at first 18 and second 19 loading stations, respectively. The structure and operation of the induction system 10 is set out in further detail below.

The induction systems 10, in accord with the principles of this invention, are illustrated in combination with a closed loop sortation conveyor 11 as previously mentioned. The sortation conveyor 11 may be that type conveyor system described in the previously referred to Speaker '665 patent. In accord with the conveyor system disclosed in that Speaker '665 patent, and as illustrated diagrammatically in FIG. 1, the sortation conveyor 11 includes a main track (not shown) formed in an endless loop 20. A plurality of carriages are movably supported on that track, each carriage including a tiltable tray 21. The carriages, i.e., the tiltable trays 21, are connected in series by a drive chain 22 in order to transport and move the trays through the closed loop 20 between loading stations 18, 19 (six as illustrated in FIG. 1) and a plurality of receiving stations 23-30 (eight as illustrated in FIG. 1). Typical tray speed is approximately 350 to 380 feet per minute but this may be varied greatly from 0 to well in excess of 380 feet per minute depending on system requirements. The receiving stations 23-30 are in the nature of bins as shown, but may be conveyors, chutes, other type containers or the like. The tray 21 of each carriage is individually and pivotally supported on that carriage, and is adapted to be tilted laterally of the conveyor travel direction (see arrow 31) in order to discharge laterally the article supported thereon into one of the receiving stations 23-30, note the tilted position of tray 21a.

Each tray 21 is manually loaded at a loading station 18 or 19 by a human operator. As the tray 21 is loaded, a programmed circuit (not shown) is established in a memory unit (not shown) by the operator through use of keyboard panel 32 to coordinate automatically the travel of the tray through the closed loop 20 to a preselected one of the receiving stations 23-30, and to actuate an automatic tilting device (not shown) at that receiving station for pivoting the tray 21 into a discharge position (see tray 21a) after precise alignment of the tray with that one predetermined receiving station has been achieved. The tilting of each tray 21 into the discharge attitude at a predetermined receiving station is automatically accomplished through interaction with the tilting device (not shown) at the receiving station, the tilting device being selectively engageable with the tray to be emptied at the desired discharge location for the tray. As the tray of the sortation conveyor 11 traverses the discharge location of receiving stations 23-30, i.e., as the tray moves past the appropriate receiving station, as programmed, into the system's memory unit (not shown) at the keyboard panel 32, the tilting device (not shown) is adapted to tilt selectively the tray either to the right or to the left, i.e., in one of opposite lateral directions, with respect to the sortation conveyor's travel direction 31 so as to discharge the article on that tray either into a right hand bin 23-26 or into a left hand bin 27-30. After having traversed the receiving stations 23-30, the tray is once again returned to the normal horizontal attitude, and is returned to the loading stations 18, 19 through the closed loop sortation conveyor system 11 to be loaded once again for repeating of the cycle.

The induction system 10 of this invention is particularly directed to apparatus and method for initially loading each tray 21 of the sortation conveyor 11 at a loading station 18 or 19. With reference to each induction system 10 illustrated in FIG. 1, and more particularly, each induction system is comprised of an infeed conveyor 12 and a reversible turn conveyor 13, the infeed conveyor being operatively connected with the reversible turn conveyor in a radial orientation relative to the center point 35 of that reversible turn conveyor, and being operatively connected with the reversible turn conveyor at the outer periphery 36 thereof. The reversible turn conveyor includes a clockwise (cw) discharge end 14 and a counterclockwise (ccw) discharge end 15, i.e., two discharge ends, the (cw) discharge end 14 opening onto first induction slide 37 which services first distribution table 16 at first loading station 18, and the (ccw) discharge end 15 opening onto second induction slide 38 which services second distribution table 17 at second loading station 19. The reversible turn conveyor 13 defines a planar and horizontal conveying surface 39 elevated above the coplanar and horizontal work surfaces 40 of distribution tables 16, 17, see FIG. 4. Each induction slide 37, 38 is, therefore, angulated between a discharge end 14, 15, respectively, of the reversible turn conveyor 13 and a distribution table 16, 17, respectively, see FIGS. 2 and 4. Note particularly that the reversible turn conveyor 13 defines a semicircular conveyor path, i.e., defines an arcuate path of 180°, as illustrated by phantom arrow 42, that conveyor path including clockwise (cw) component 43 and counterclockwise (ccw) component 44. Note also that articles (not shown) discharged from the discharge ends 14, 15 of the reversible turn conveyor 13 are discharged in a direction (see phantom arrows 45, 46) generally normal to the conveyor path direction 31 of the sortation conveyor 11 as illustrated in FIGS. 1 and 2. In other words, the discharge ends 14, 15 of the reversible turn conveyor 13 are oriented generally parallel to the conveyor path 31 of the sortation conveyor, thereby providing a generally U-shaped configuration in connection with top induction slides 37, 38 and the distribution tables 16, 17 served thereby, all as illustrated in FIG. 1. The reversible turn conveyor 13 also includes along the inner periphery 65 thereof, a curved wall 66 adapted to prevent articles discharged onto the reversible turn conveyors 13 from the infeed conveyor from falling off the inner periphery thereof, see FIGS. 2 and 3.

As shown particularly in FIGS. 2, 4 and 5, each reversible turn conveyor 13 comprises a semi-circular endless conveyor belt 50 that defines an arc of 180°. The conveyor belt 50 is carried on rollers 51, 52 at each end of the turn, those rollers being supported in appropriate framework 53 of the reversible turn conveyor, and on slider bed 53a. Note particularly that the rollers 51, 52 are of a frustoconical cross-sectional configuration, one side of each roller being disposed parallel to the conveying plane 39 of the belt. This orientation of the rollers 51, 52 angulates the axis 54 of each roller relative to the conveying plane 39 of the conveyor belt 50, and this relationship of the rollers to the conveyor belt aids in maintaining the proper tracking alignment of the conveyor belt during use of the reversible turn conveyor 13.

The drive mechanism for the reversible turn conveyor 13 includes a side bow chain 49 attached to the outer periphery 36 of the belt, thereby establishing an endless chain along the exterior periphery thereof. Idler sprockets, not shown, are spaced around the outer periphery of the reversible turn conveyor to guide and movably hold the chain, and thus the belt, in an arcuate path. The drive mechanism also includes two separate motor drives 56, 57 for the reversible turn conveyor 13, one at each end 14, 15 of the reversible turn conveyor. Each motor drive 56, 57 includes a motor 58 connected to a drive sprocket 59 on drive shaft 60, a clutch 61 being interposed between the motor and the drive sprocket on that shaft. The drive sprocket 59 is connected by drive chain 55 to driven sprocket 62 mounted on a roller shaft 48, that roller shaft also carrying conveyor belt sprocket 63. The conveyor belt sprocket 63 is drivingly engaged with the side bow chain 49 on the exterior periphery of the reversible turn conveyor's belt 50. Thus, each motor 58 drives the reversible turn conveyor 13 through driving relation of rollers 51, 52 with the conveyor belt 50, as well as through driving relation of the conveyor belt sprocket 63 with the conveyor belt's side bow chain 49. Two motor drives 56, 57 are provided one at each discharge end 14, 15 of the reversible turn conveyor 13, so that when the reversible turn conveyor is being driven in the clockwise direction (see phantom arrow 43 and as described in further detail below), the conveyor belt 50 in conveying plane 39 can be pulled toward its discharge end 14, and also that when the reversible turn conveyor is being driven in the counterclockwise direction (see phantom arrow 44 and as described in further detail below), the conveyor belt in conveying plane 39 can be pulled toward its discharge end 15. In other words, it is desirable to drive the conveyor belt 50 at the discharge end 14 or 15 of the reversible turn conveyor 13 depending on whether the reversible turn conveyor is being operated in the respective clockwise or counterclockwise directions.

Each discharge end 14, 15 of the reversible turn conveyor 13 is structurally connected to an induction slide 37 or 38, see FIG. 4. As previously noted, the conveying plane 39 of the reversible turn conveyor is disposed in a horizontal plane elevated above the horizontal plane 40 of the distribution tables 16, 17. Hence, an induction slide 37 or 38 connects the discharge end 14 or 15 of the reversible turn conveyor with the lower distribution table 16 or 17. Note that, as shown, the angle 67 of the induction slide with the horizontal is about 20°, see FIG. 4. However, the induction slide's upper edge 68 is adjacent the associated discharge end of the reversible turn conveyor 13 at a point located at an angle 69 of about 30° below horizontal, also see FIG. 4. In other words, and as viewed from the side in FIG. 4, the upper edge 68 of the induction slide is disposed behind the leading edge 70 of the reversible turn conveyor's associated discharge end so that no article may fall between the induction slide and the reversible turn conveyor's discharge end as articles are discharged onto the induction slide by the reversible turn conveyor. Each induction slide 37, 38 is provided with a guard wall 71, 72 on each side edge thereof, those guard walls extending upwardly above the slide surface 73 of the induction slide so as to prevent articles discharged onto the induction slide from falling off the slide. In effect, each induction slide's inner wall 72 is a continuation of the reversible turn conveyor's inner wall 66. As is particularly illustrated in FIG. 2, that inner wall 72 of each induction slide 37 or 38 is angled inwardly toward the outer wall 71 of the induction slide so as to direct articles sliding down the induction slide onto the distribution table 16 or 17 which that slide serves.

Each distribution table 16, 17 is simply a planar table which is adjacent a loading station 18, 19, respectively, for the sortation conveyor 11. Each distribution table 16, 17 includes an upwardly extending wall 74 along the far edge thereof for preventing articles discharged into that loading station from falling off the far edge of the table, i.e., from falling off that edge of the table opposite to that edge most closely adjacent the human operator who mans the loading station 18 or 19. The walls 74 are, in effect, continuations of the induction slide's walls 71 or 72, see FIG. 2.

The infeed conveyor 12 that serves the reversible turn conveyor 13 is particularly illustrated in FIGS. 2 and 3. As shown in those Figures, the infeed conveyor 12 is simply in the nature of an endless belt 75 conveyor driven by a motor drive 79, the discharge end 76 only of which is shown in the Figures. Typical speed of this conveyor is approximately 80–125 feet per minute, but this may vary greatly depending on system requirements. The endless belt conveyor is carried in framework 77 that includes, adjacent the discharge end, side walls 78 on opposite sides thereof to prevent articles on the conveyor's belt 75 from falling off the side edges thereof. The side walls 78 terminate in outwardly flaring funnel walls 80 at the discharge end 76 of the infeed conveyor 12 on opposite sides thereof. The outwardly flaring funnel walls 80 cooperate with a slide floor 81 at the discharge end to interconnect the infeed conveyor's discharge end 76 with an outer peripheral rail 82 on the outer periphery 36 of the reversible turn conveyor 13. The outer rail 82 of the reversible turn conveyor 13 is part of the framework 53 of that reversible turn conveyor. Note particularly, as illustrated in FIG. 3, that the funnel walls 80 and slide floor 81 of the infeed conveyor 12 define an arcuate lip 83 which seats on the framework rail 82 of the reversible turn conveyor 13, those walls 80 and floor 81 being retained in position on that rail 82 by spot welds 84 so as to locate the infeed conveyor 12 in operative position with the reversible turn conveyor 13. This interconnection of the infeed conveyor 12 with the reversible turn conveyor 13 permits the infeed conveyor to be initially positioned at variable points and particularly at any location in an arc 85 of 90° between an extreme counterclockwise position illustrated in FIG. 2 in solid lines and an extreme clockwise position illustrated in FIG. 2 in phantom lines. In other words, this connector structure 82, 83 of the infeed conveyor 12 with the reversible turn conveyor 13 permits the infeed conveyor to be radially aligned with the reversible turn conveyor at any angular location within the center 90° arc 85 of that reversible turn conveyor simply by orienting the infeed conveyor into the desired position with the exterior rail 82 of the reversible turn conveyor's framework 53, and thereafter field fitting the walls described above. This adjustable connector 82, 83 structure, therefore, permits the linear infeed path 86 defined by the infeed conveyor 12 to be oriented radially relative to the reversible turn conveyor's arcuate path 42 at that angle desired for accommodating the induction system 10 to the required floor layout at the final installation site of the sortation system.

A control circuit 100 for the induction system 10 of this invention is diagrammatically illustrated in FIG. 6. The control circuit 100 can be of any structure or design such that any of three modes of control may be provided for the induction system 10 to the operators who man the two loading stations 18, 19. The three control modes are manual, as controlled by both of the operators, article activated as controlled by back up of articles on the induction slides 37, 38, and automatic as controlled by a timer 101. The main components of the control circuit, in addition to timer 101, include the first 32 and second 33 operator-controlled keyboard panels (each of which includes an off/on switch, not shown) at the distribution tables 16, 17 and a first 87 and second 88 photocell unit at the induction slides 37, 38, respectively. The keyboard panels 32, 33, timer 101 and photocell units 87, 88 are electrically connected by leads 89 with a central switching or control box 90. The switching box 90 is electrically connected by leads 91 with the clutch 61 of each motor drive 56 for the reversible turn conveyor 13, and is also electrically connected by lead 92 with the motor drive 79 for the infeed conveyor 12. During use of the induction system 13, the reversible turn conveyor's motors 58 both run continuously, the clockwise 43 or counterclockwise 44 directional path of that conveyor being determined by the engagement/disengagement attitude of both clutches 61. In other words, when clutch 61 at discharge end 14 is engaged then clutch 61 at discharge end 15 is disengaged so that the conveyor path is clockwise, and vice versa. Also during use, the infeed conveyor is driven or stopped as controlled by the engagement or disengagement of the motor drive 79. Thus, and by this control circuit 100, the reversible turn conveyor's clutches 61 (and, hence, the clockwise or counterclockwise rotational direction of the reversible turn conveyor 13), and the infeed conveyor motor drive can be controlled manually by a human operator, at either station 18 or 19, through use of off/on switches on the keyboard panels 32, 33, or can be controlled automatically by article position on the induction slides 37, 38 as sensed by photocell units 87, 88, or can be controlled automatically by the timer 101, thereby providing the three modes of control for the induction system 10 of this invention.

As an example, in one embodiment, the infeed conveyor is operated at a lineal speed in the range of about 80 to 125 feet per minute and, on a transport basis, at a speed of about 50 articles per minute. The reversible belt turn is operated at a speed of about 160 feet per minute or, translated into a transport basis, of about 25 articles per minute at each end. This article rate (25 per minute) is well within the capability of a trained operator, while the rate of 50 articles per minute is not presently sustainable by an operator for a significant period of time.

In use, the reversible turn conveyor 13 is adapted to feed two distribution tables 16, 17, i.e., two loading stations 18, 19 for a sortation conveyor 11 from a single infeed conveyor 12, thereby materially increasing the accurate throughput of articles from that single infeed conveyor onto the sortation conveyor.

As previously noted, there are three possible operational modes, i.e., control modes, for the induction system 10 of this invention. In the manual mode, and assuming a human operator is manning each loading station 18, 19, i.e., is manning each distribution table 16, 17, the conveyor path 42 of the reversible turn conveyor 13 is controlled manually from the control panels 32, 33 by each operator through use of off/on switches (not shown). The operator at the first loading station 18 switches the reversible turn conveyor 13 through the control circuit shown in FIG. 6 to cause that conveyor to move in a clockwise path 43 when a supply of articles is desired, thereby discharging articles onto the first distribution table 16. The operator at the second loading station 19 switches the reversible turn conveyor 13 to the counterclockwise path 44 when a supply of articles is desired, thereby discharging articles onto the second distribution table 17. The sequence is repeated as required by the first and second operators so that each operator maintains a supply of articles for manual direction onto the sortation conveyor 11. Alternatively, the system can be controlled if desired by a single operator at either station 18 or 19. In this case, of course, the system would be primarily used to feed only one loading station and, while not primarily preferred, this capability adds to the control and operational capacities of the invention.

In the first automatic mode, the operation of the reversible turn conveyor 13 is controlled by photocell units 87, 88 at the top end of the induction slides 37, 38. In this automatic mode, and for example, the reversible turn conveyor 13 runs a clockwise path 43 until articles on the first distribution table 16 and the first induction slide 37 back up to the point where photoelectric beam 95 is broken, thereby reversing the conveyor direction into a counterclockwise path 44 through control circuit 100. Subsequently, the reversible turn conveyor 13 operates in the counterclockwise path 44 discharging articles onto the second distribution table 17 and second induction slide 38 until the articles thereon back up and break the photoelectric beam 96. Breaking of beam 96 causes the reversible turn conveyor 13 to reverse back to the clockwise path 43. This sequence is repeated continuously as long as articles are fed to the reversible turn conveyor 13 by the infeed conveyor 12.

In the second automatic mode, timer 101 controls the time period of the clockwise rotation and counterclockwise rotation of the reversible turn conveyor 13. In other words, the reversible turn conveyor 13 is reversed in its conveyor path 43, 44 every so often, for example every thirty seconds, so that the article supply to the first distribution table 16 and the second distribution table 17 is effectively equalized in a consistent fashion on a time basis. In this second automatic mode, therefore, the conveyor path direction of the reversible turn conveyor 13 is simply cycled between the clockwise path 43 and the counterclockwise path 44 every so often regardless of the desires of the operators, or the back up or lack thereof of articles on either distribution table 16, 17. Each of these three operational modes functions independent from one another. In other words, in the manual operation mode the photoelectric units 87, 88 and the timer 101 are inoperative; in the photoelectric unit 87, 88 mode, the manual control panel 32, 33 switches and timer 101 are not used; and in the timer 101 mode, the manual control panel 32, 33 switches and photoelectric units 87, 88 are not used.

In each of the control modes, a time delay comprising a timed stop-start control means 93 (see FIG. 6) controls stopping and starting (through disengagement/engagement of drive 79) of the infeed conveyor 12 when reversing of the conveyor path 43 to 44, and vice versa, occurs. This time delay is selected to permit the articles between the operative discharge end (14 or 15) and the point where the infeed conveyor feeds onto the turn conveyor to clear the infeed point, in the reverse direction, before infeed conveyor 12 is restarted. The time delay, in stopping infeed conveyor 12 once reversal is dictated by either of the manual or automatic control modes, is necessary to prevent jamming of new articles onto the reversible turn conveyor 13 against articles already on the reversible turn conveyor immediately after the conveyor path direction of the reversible turn conveyor has been reversed. Thus, the articles on the reversible turn are effectively cleared from the infeed point before new articles are introduced.

In the embodiment illustrated in FIGS. 1 and 2, and for example, this time delay may amount to a longer period when the reversible turn conveyor 13 is reversed from the clockwise direction 43 to the counterclockwise direction 44, and may amount to a shorter period when the reversible turn conveyor is reversed from the counterclockwise direction 44 to the clockwise direction 43. This difference in time delays is for the reason that a greater quantum of articles is likely to be on the reversible turn conveyor's belt 50 in that arcuate segment 98 downstream of the infeed conveyor 12 when the reversible turn conveyor 13 is reversed from the clockwise 43 to the counterclockwise 44 direction, than is likely to be on the reversible turn conveyor's belt 50 in that arcuate segment 94 downstream of the infeed conveyor when the reversible turn conveyor is reversed from the counterclockwise to the clockwise direction, all due to the peripheral location of the infeed conveyor 12 with the reversible turn conveyor in the embodiment shown. Thus, each time the turn conveyor is reversed, the infeed conveyor is stopped until the turn conveyor is clear of articles at the infeed point.

Once articles are present on a distribution table 16 or 17 in a loading station 18 or 19, the operator reviews each article to determine the destination or type thereof. Since a single tilt tray sortation conveyor 11 serves multiple induction systems 10 (six individual loading stations 18, 19 as shown in FIG. 1), the trays 21 moving past a single loading station are randomly full or empty. After the destination or type has been determined, and as an empty tray 21 passes the end of the operator's table, the operator manually establishes a destination or type code for that horizontal tray in the sortation conveyor's memory unit (not shown) through the ajdacent keyboard control panel, and manually shoves the article onto that now code controlled tray. Thereafter, the tray 21 moves the article from the loading station to a receiving station 23-30, and when that tiltable tray reaches the proper receiving station (as determined by the destination code programmed in the sortation conveyor's memory unit) the stored signal in the memory unit (not shown) causes the tipping assembly (not shown) at the predetermined receiving station to be activated so that the tray unloads the article in the appropriate receiving station. Thus, and at the loading station 18 or 19, the human operator reads the code on the article and manually places the article onto an individual tray 21 of the sortation conveyor 11, simultaneously coding that tray for unloading of the article in the appropriate receiving station 23-30. Of course, respective articles from each of the loading stations 18 and 19 can be introduced onto the sortation conveyor at substantially the same time. Operation of the sortation conveyor 11 is disclosed in greater detail in the Speaker '665 patent.

Accordingly, the present invention provides a new and improved apparatus and methods which substantially increase the speed of article induction onto a sortation conveyor from a single infeed conveyor, provide operation versatility for one or two operators and in different modes, and provide system versatility due to the capability of use with infeed conveyors at various angles to the turn conveyor or the loading stations.

Having described in detail the preferred embodiment of my invention, these and other advantages and modifications will become readily apparent to those of ordinary skill in the art without departing from the scope of the invention. For example, in one modification, a single straight line reversible conveyor, feed between its ends, could be used in place of the reversible turn conveyor, and curved induction slides fitted at each of the two selective discharge ends. Such a configuration requires more vertical installation clearance, however, due to the extra induction slide depth requirement caused by the slide turn structure. Also, a similar reversible straight-line conveyor could be utilized between parallel runs of a sortation conveyor, selectively discharging articles into a loading station for each run.

Accordingly, applicant intends to be bound only by the claims appended hereto.

I claim:

1. Induction apparatus for inducting articles onto a sortation conveyor moving in one direction, said apparatus disposed between a single infeed conveyor and said sortation conveyor, said induction apparatus comprising,
   a 180° reversible single belt turn having first and second spaced discharge ends disposed to discharge articles thereon in a direction normal to said one direction,
   first and second inclined induction slides operatively disposed to receive articles from said first and sceond discharge ends, respectively, each slide having an upper end adjacent a respective discharge end of said reversible belt turn and a lower end,
   first and second distribution tables operatively disposed at the lower ends of said first and second induction slides, respectively, said first and second distribution tables receiving articles from said respective induction slides in directions normal to said one direction,
   said infeed conveyor being operatively connected with said 180° reversible belt turn at an infeed point within a center 90° segment of said reversible belt turn, and
   means for controlling said infeed conveyor and said 180° reversible belt turn conveyor whereby said infeed conveyor is stopped when said reversible belt turn is reversed from a first to a second opposite direction, and articles, which are first conveyed in a first direction on said belt turn are conveyed in said second opposite direction, upon reversing of said belt turn, and past said infeed point prior to starting of said infeed conveyor.

2. An induction system as set forth in claim 1, said reversible turn defining a generally horizontal conveyor plane elevated above the generally horizontal planes defined by said distribution tables, a distance approximately equal to the vertical distance between the upper and lower ends of said slides.

3. An induction system as set forth in claim 1, including
   connector structure by which said infeed conveyor is operatively connected with said reversible turn conveyor, said connector structure permitting said infeed conveyor to be connected with said reversible turn conveyor on the exterior periphery of said reversible turn conveyor at variable locations along the length thereof within said center 90° segment.

4. An induction system as set forth in claim 1, including
   at least one of a manual control means and an automatic control means for said reversible turn conveyor, said control means functioning to control the conveyor direction of said reversible turn conveyor.

5. An induction system as set forth in claim 4 wherein said control means is an automatic control means, said automatic control means including:
   a photoelectric means associated with each of said first and second loading stations, said photoelectric means activating said control means for reversing the conveyor path direction of said reversible turn conveyor when articles back up at eiher loading station to break the beam of that photoelectric unit associated therewith.

6. An induction system as set forth in claim 5 wherein said control means is an automatic control means, said automatic control means including
   a timed control means operatively connected with said infeed conveyor, said timed control means operative to stop said infeed conveyor when the direction of the reversible turn conveyor is reversed, and to start said infeed conveyor after passage of a preset period of time during operation of said reversible turn conveyor.

7. An induction system as set forth in claim 4 wherein said control means is an automatic control means, said automatic control means including
   a timer connected with said reversible turn conveyor, said timer continuously reversing the direction of the conveyor path of said reversible turn conveyor after passage of a present period of time.

8. An induction system as set forth in claim 4 wherein said control means is an automatic control means, said automatic control means including a timed control means operatively connected with said infeed conveyor, said timed control means operative to stop said infeed conveyor when the direction of the reversible turn conveyor is reversed, and to start said infeed conveyor after passage of a preset period of time during operation of said reversible turn conveyor.

9. An induction system as set forth in claim 1, said reversible turn conveyor comprising
   a motor drive unit at each discharge end of said reversible turn conveyor, the motor drive unit at the first discharge end of said reversible turn conveyor being operative when said reversible turn conveyor is operating in that conveyor direction which results in articles being discharged from that first discharge end, and the motor drive unit at the second discharge end of said reversible turn conveyor being operative when said reversible turn conveyor is operating in the conveyor direction which results in articles being discharged from that second discharge end.

10. An induction system as set forth in claim 1, said reversible turn conveyor further comprising
    an endless belt,
    a side bow chain mounted on the exterior peripheral edge of said arcuate belt, and
    a motor drive unit connected with said side bow chain.

11. An induction system as in claim 1 wherein said infeed conveyor operates at about 80 to 125 feet per minute and said sortation conveyor operates in an approximate range of 350 to 380 feet per minute.

12. An induction system as in claim 1 wherein articles are carried by said infeed conveyor at the rate of about 50 per minute, and by said reversible turn conveyor, to each discharge end thereof, at the rate of about 25 articles per minute.

13. An induction apparatus for introducing articles from a single infeed conveyor to a sortation conveyor, said induction apparatus comprising:
    a first sortation conveyor loading station and a second sortation conveyor loading station, said loading stations being spaced one from the other, and said loading stations being juxtaposed to said sortation conveyor, and
    a 180° reversible single belt turn conveyor having a first discharge end and a second discharge end, said reversible conveyor defining an acruate conveyor path between first and second discharge ends, said reversible conveyor being reversible to operate in opposed directions, said first discharge end being positioned to direct articles from said reversible conveyor toward said first loading station, when said reversible conveyor is operated in one of said directions, and said second discharge end being positioned to direct articles from said reversible conveyor toward said second loading station when said reversible conveyor is operated in the other of said directions
    said infeed conveyor being operatively connected with said reversible conveyor at an infeed location intermediate said discharge ends and within a center 90° segment of said reversible conveyor for directing articles from said infeed conveyor onto said reversible conveyor, and
    control means for stopping said infeed conveyor upon reversing of said reversible conveyor and for delaying starting said infeed conveyor until articles on said reversible conveyor, which were first conveyed in one direction and then in an opposite direction upon reversing, are conveyed downstream of said infeed location.

14. Apparatus for handling articles including an infeed conveyor and improved means for dividing articles discharged from the infeed conveyor and for conveying the divided articles downstream in two separate paths, said improved dividing and conveying means comprising:
    a first station and a second station, said stations being spaced one from the other, and said stations being adapted for receiving articles,
    a 180° reversible single belt turn conveyor having a first discharge end and a second discharge end, said reversible turn conveyor defining a generally arcuate conveyor path between first and second discharge ends, and being operative in both clockwise and counterclockwise directions, said first discharge end being positioned to direct articles from said reversible turn conveyor toward said first station, when said reversible turn conveyor is operated in one of said clockwise and counterclockwise directions, and said second discharge end being positioned to direct articles from said reversible turn conveyor toward said second station when said reversible turn conveyor is operated in the other of said clockwise and counterclockwise directions, and said infeed conveyor being operatively connected with said reversible turn conveyor intermediate said discharge ends thereof for directing articles from said infeed conveyor onto said reversible turn conveyor, and
    means for controlling said infeed conveyor and said 180° reversible belt turn conveyor whereby said infeed conveyor is stopped when said reversible belt turn is reversed from a first to a second opposite direction, and articles, which first conveyed in a first direction on said belt turn are conveyed in said second opposite direction, upon reversing of said belt turn, and past said infeed point prior to starting of said infeed conveyor.

15. A method of transferring articles from a single infeed conveyor to a sortation conveyor through a reversible arcuate conveyor means having first and second discharge ends, and comprising the steps of:
    introducing articles from said infeed conveyor onto said acruate conveyor means intermediate said discharge ends at an infeed location,
    reversing said acruate conveyor means between directions so as to discharge articles alternately from respective discharge ends into a first loading station and into a second loading station respectively,
    stopping said infeed conveyor when said acruate conveyor means is reversed from one direction to a reverse direction,
    starting said infeed conveyor after said arcuate conveyor means has run in said reverse direction a distance equal to that between the infeed location and the discharge end other than that toward which the arcuate conveyor means runs in said reverse direction, and
    thereafter transferring said articles from said first and second loading stations onto said sortation conveyor.

16. A method as set forth in claim 15 in which said arcuate conveyor means extends about 180°, and including discharging articles from said arcuate conveyor means in a direction generally normal to the conveyor path of said sortation conveyor.

17. A method as set forth in claim 15 including the steps of
providing a distribution table for each of said first and second loading stations,
orienting said arcuate conveyor means at a level that is above the level of both of said distribution tables, and
discharging said articles from said arcuate conveyor means onto a slide interconnecting each distribution table with one discharge end of said arcuate conveyor means, said articles thereby sliding onto said distribution table after having been discharged from said arcuate conveyor means.

18. A method as set forth in claim 15 including the step of
controlling the direction of said arcuate conveyor means by manually causing the direction thereof to be changed as desired by the operators manning said first and second loading stations.

19. A method as set forth in claim 15 including the step of
automatically reversing the direction of said arcuate conveyor means upon sensing of a backlog of articles in one of said loading stations.

20. A method as in claim 15 including the step of reversing the direction of said arcuate conveyor means upon passage of a preset period of time.

21. A method as set forth in claim 15 including the step of stopping said infeed conveyor when the direction of said acruate conveyor means is reversed, and
restarting said infeed conveyor after passage of a preset period of time, during running of said arcuate conveyor means in a reverse direction, to permit articles on said arcuate conveyor means to pass a point at which subsequent articles are to be introduced onto said arcuate conveyor means from said infeed conveyor.

22. A method as in claim 15 including the step of introducing articles from said two stations onto said sortation conveyor at substantially the same time.

23. A method as in claim 15 including reversing said reversible turn conveyor only upon a control demand from a station not receiving articles.

* * * * *

UNITED STATES PATENT AND TRADEMARK OFFICE
CERTIFICATE OF CORRECTION

PATENT NO. : 4,140,213
DATED : February 20, 1979
INVENTOR(S) : Reiner K. Denison It is certified that error appears in the above-identified patent and that said Letters Patent are hereby corrected as shown below:

| | | | |
|---|---|---|---|
| Col. 2 | Line 13 | "device" | should be --devices-- |
| Col. 2 | Line 61 | "aove" | should be --above-- |
| Col. 12 | Line 46 | "eiher" | should be --either-- |
| Col. 13 | Line 19 | "the" | should be --that-- |
| Col. 13 | Line 48 | "acruate" | should be --arcuate-- |
| Col. 14 | Line 48 | "acruate" | should be --arcuate-- |
| Col. 14 | Line 50 | "acruate" | should be --arcuate-- |
| Col. 14 | Line 54 | "acruate" | should be --arcuate-- |
| Col. 15 | Line 9 | "acruate" | should be --arcuate-- |

Signed and Sealed this

Ninth Day of October 1979

[SEAL]

Attest:

RUTH C. MASON
Attesting Officer

LUTRELLE F. PARKER
Acting Commissioner of Patents and Trademarks